US012571931B2

(12) United States Patent
Egorov et al.

(10) Patent No.: US 12,571,931 B2
(45) Date of Patent: Mar. 10, 2026

(54) METHOD AND APPARATUS FOR AUTONOMOUS GRAVITY AND/OR MAGNETIC FIELD MEASUREMENT

(71) Applicant: SAUDI ARABIAN OIL COMPANY, Dhahran (SA)

(72) Inventors: Anton Egorov, Moscow (RU); Grigoriy Yashin, Moscow (RU); Mustafa N. AlAli, Moscow (RU); Daniele Colombo, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 367 days.

(21) Appl. No.: 18/259,470

(22) PCT Filed: Aug. 24, 2022

(86) PCT No.: PCT/RU2022/000260
§ 371 (c)(1),
(2) Date: Jun. 27, 2023

(87) PCT Pub. No.: WO2024/043801
PCT Pub. Date: Feb. 29, 2024

(65) Prior Publication Data
US 2024/0393491 A1    Nov. 28, 2024

(51) Int. Cl.
*G01V 3/08*          (2006.01)
*B60F 5/02*          (2006.01)
(Continued)

(52) U.S. Cl.
CPC ................ *G01V 3/081* (2013.01); *B60F 5/02* (2013.01); *G01V 3/08* (2013.01); *G01V 3/10* (2013.01);
(Continued)

(58) Field of Classification Search
CPC .......... G01V 3/081; G01V 3/165; G01V 7/16; G01V 11/005; G01V 3/15; G01V 11/00;
(Continued)

(56) References Cited

U.S. PATENT DOCUMENTS 5,575,438 A    11/1996  McGonigle et al.
5,661,649 A     8/1997  Carson et al.
(Continued)

FOREIGN PATENT DOCUMENTS

CN       207833034 U    9/2018
EP       3301661 A1     4/2018
(Continued)

OTHER PUBLICATIONS

RU 201918 Machine Translation, Jan. 21, 2021 (Year: 2021).*
(Continued)

*Primary Examiner* — Raul J Rios Russo
(74) *Attorney, Agent, or Firm* — Osha Bergman Watanabe & Burton LLP

(57)            ABSTRACT

A measurement vehicle includes a geophysical sensor. One or more operational sensors are configured to detect operational data related to operation of the measurement vehicle. A driving system is configured to move the measurement vehicle in a travel direction relative to a measurement point. A controller is configured to receive information from the geophysical sensor and the operational sensors, and to control the driving system based on the information.

21 Claims, 10 Drawing Sheets

(51) Int. Cl.

| | | |
|---|---|---|
| *G01V 3/10* | (2006.01) | |
| *G01V 3/15* | (2006.01) | |
| *G01V 3/16* | (2006.01) | |
| *G01V 3/165* | (2006.01) | |
| *G01V 7/16* | (2006.01) | |
| *G01V 11/00* | (2006.01) | |

(52) U.S. Cl.
CPC .............. *G01V 3/101* (2013.01); *G01V 3/102* (2013.01); *G01V 3/104* (2013.01); *G01V 3/105* (2013.01); *G01V 3/107* (2013.01); *G01V 3/108* (2013.01); *G01V 3/165* (2013.01); *G01V 7/16* (2013.01); *G01V 11/005* (2013.01); *G01V 3/15* (2013.01); *G01V 3/16* (2013.01)

(58) Field of Classification Search
CPC . G01V 3/08; G01V 3/10; G01V 3/101; G01V 3/102; G01V 3/104; G01V 3/105; G01V 3/107; G01V 3/108; G01V 3/16; B60F 5/02; B60F 5/00
USPC ...................................................... 324/326
See application file for complete search history.

(56) References Cited

U.S. PATENT DOCUMENTS

| | | | |
|---|---|---|---|
| 9,400,338 | B2 | 7/2016 | Coste et al. |
| 9,623,967 | B2 | 4/2017 | Mallard |
| 9,933,534 | B2 | 4/2018 | Talaalout et al. |
| 10,303,415 | B1 | 5/2019 | Ananthanarayanan et al. |
| 2010/0153050 | A1 | 6/2010 | Zumberge et al. |
| 2014/0126329 | A1 | 5/2014 | Guyton et al. |
| 2014/0307525 | A1 | 10/2014 | Postel et al. |
| 2016/0003954 | A1 | 1/2016 | Broussard, III et al. |
| 2016/0161625 | A1* | 6/2016 | Partner .................. G01V 3/165 |
| | | | 324/331 |
| 2017/0144746 | A1 | 5/2017 | Schank et al. |
| 2019/0187319 | A1* | 6/2019 | Smiarowski ............. G01V 3/16 |
| 2020/0401132 | A1 | 12/2020 | Augugliaro et al. |
| 2021/0080598 | A1 | 3/2021 | Adler et al. |
| 2021/0181367 | A1* | 6/2021 | Miles ....................... G01V 3/16 |
| 2021/0283783 | A1 | 9/2021 | Gillett |
| 2024/0134081 | A1* | 4/2024 | Bagrianski ............... G01V 3/16 |
| 2024/0230943 | A9* | 7/2024 | Bagrianski ............... G01V 3/16 |

FOREIGN PATENT DOCUMENTS

| | | | |
|---|---|---|---|
| KR | 101651600 | B1 | 8/2016 |
| RU | 2128851 | C1 | 4/1999 |
| RU | 2321523 | C1 | 4/2008 |
| RU | 2563921 | C1 | 9/2015 |
| RU | 179434 | U1 | 5/2018 |
| RU | 2697474 | C1 | 8/2019 |
| RU | 2700323 | C2 | 9/2019 |
| RU | 201918 | U1 | 1/2021 |
| RU | 2789564 | C1 | 2/2023 |
| WO | 2013/177340 | A1 | 11/2013 |
| WO | 2017/219295 | A1 | 12/2017 |
| WO | 2018/077810 | A1 | 5/2018 |
| WO | 2019064328 | A1 | 4/2019 |
| WO | 2021/016148 | A1 | 1/2021 |

OTHER PUBLICATIONS

RU 2700323 Machine Translation, Sep. 16, 2019 (Year: 2019).*
RU 2321523 Machine Translation, Apr. 10, 2008 (Year: 2008).*
RU 2128851 Machine Translation, Apr. 10, 1999 (Year: 1999).*
Non-Final Office Action issued in corresponding U.S. Appl. No. 18/001,069, mailed Oct. 21, 2024 (19 pages).
G. Mamon; "A Traverse Gravimeter for the Lunar Surface"; IEEE Transactions on Geoscience Electronics; vol. GE-10, No. 1; pp. 64-72; Jan. 1972 (9 pages).

B. Hockman et al.; "Gravimetric localization on the surface of small bodies"; In 2018 IEEE Aerospace Conference; pp. 1-12; 2018 (12 pages).
K. W. Lewis et al.; "A surface gravity traverse on Mars indicates low bedrock density at Gale crater"; Science, 363 (6426), pp. 535-537, Feb. 1, 2019 (4 pages).
D. Crossley et al.; "The measurement of surface gravity"; Reports on Progress in physics; vol. 76, No. 4; Mar. 18, 2013 (47 pages).
T. Ishihara et al.; "High-resolution gravity measurement aboard an autonomous underwater vehicle"; Geophysics; vol. 83, No. 6; pp. G119-G135; Nov.-Dec. 2018 (17 pages).
H.O. Seigel et al.; "A guide to high precision land gravimeter surveys"; Scintrex Limited; Aug. 1995 (132 pages).
M. Dransfield et al.; "Airborne gravity gradiometry in the search for mineral deposits"; In Proceedings of Exploration, vol. 7; pp. 341-354; 2007 (14 pages).
A. Bertolini; "Portable Gravity Gradiometer Using a Monolithic Sapphire Differential Accelerometer"; In 1st EAGE North African/ Mediterranean Petroleum & Geosciences Conference & Exhibition; Oct. 2003 (4 pages).
A. Prasad et al.; "A high-sensitivity, low-drift MEMS relative gravimeter for multi-pixel imaging applications"; In EGU General Assembly Conference Abstracts; p. 18528; May 2020 (1 page).
E. de Barros Camara et al.; "Magnetic airborne survey-geophysical flight"; Geoscientific Instrumentation, Methods and Data Systems, vol. 5, No. 1; pp. 181-192, Jun. 6, 2016 (12 pages).
A. Malehmir et al.; "The potential of rotary-wing UAV-based magnetic surveys for mineral exploration: A case study from central Sweden"; The Leading Edge, vol. 36, No. 7; pp. 552-557; Jul. 2017 (6 pages).
A. V. Parshin et al.; "Low-altitude geophysical magnetic prospecting based on multirotor UAV as a promising replacement for traditional ground survey"; Geo-spatial Information Science, vol. 21, No. 1; pp. 67-74; Jan. 5, 2018 (9 pages).
T.S. de Smet et al.; "Successful application of drone-based aeromagnetic surveys to locate legacy oil and gas wells in Cattaraugus county, New York"; Journal of Applied Geophysics 186(C); 2021 (12 pages).
B. Gavazzi et al.; "Fluxgate three-component magnetometers for cost-effective ground, UAV and airborne magnetic surveys for industrial and academic geoscience applications and comparison with current industrial standards through case studies"; Geomechanics for Energy and the Environment, vol. 20; 2019 (11 pages).
G. Yashin et al.; "LocoGear: Locomotion Analysis of Robotic Landing Gear for Multicopters"; IEEE Journal on Miniaturization for Air and Space Systems, vol. 1, No. 2; pp. 138-147; 2020 (10 pages).
M. Pitonyak et al.; "Locomotion and Transitional Procedures for a Hexapod-Quadcopter Robot"; Proc. IEEE International Conference on Systems, Man, and Cybernetics (SMC); Banff Center, Banff, Canada; Oct. 5-8, 2017; pp. 1447-1452 (6 pages).
C. D. Bellicoso et al.; "Advances in real-world applications for legged robots"; Journal of Field Robotics, vol. 35, No. 8; pp. 1311-1326; Dec. 2018 (16 pages).
Spot; Boston Dynamics; Retrieved from the Internet: URL: https://www.bostondynamics.com/products/spot> (17 pages).
C. Gehring et al.; "ANYmal in the field: Solving Industrial Inspection of an Offshore HVDC Platform with a Quadrupedal Robot"; Field and Service Robotics; Springer Proceedings in Advanced Robotics, vol. 16; 2021 (15 pages).
B.H. Wilcox et al.; "Athlete: A Cargo Handling and Manipulation Robot for the Moon"; Journal of Field Robotics, vol. 24, No. 5; pp. 421-443; 2007 (14 pages).
Hyundai; "Hyundai Motor Group Unveils Tiger uncrewed Ultimate Mobility Vehicle concept"; URL: <https://www.hyundai.com/worldwide/en/company/newsroom/0000016622> (10 pages).
Phelps, G. et al.; "Investigations into near-real-time surveying for geophysical data collection using an autonomous ground vehicle"; U.S. Geological Survey Open-File Report 2014-1013 (18 pages).
International Search Report issued in PCT/RU2022/000260 on May 11, 2023 (4 pages).
Written Opinion of the International Searching Authority issued in PCT/RU2022/000260 on May 11, 2023 (5 pages).

(56)                References Cited

OTHER PUBLICATIONS

International Search Report issued in International Application No. PCT/RU/2023/000188 dated Mar. 14, 2024 (4 pages).
Written Opinion issued in International Application No. PCT/RU/ 2023/000188 dated Mar. 14, 2024 (6 pages).

* cited by examiner

METHOD AND APPARATUS FOR AUTONOMOUS GRAVITY AND/OR MAGNETIC FIELD MEASUREMENT

BACKGROUND

Gravity and magnetic field recordings are often used for the determination of the Earth's internal structure. Gravimetric prospecting is a geophysical technique which is able to identify anomalies in the gravity acceleration generated by contrasts in density among bodies in the subsurface. Gravimetric prospecting is used to map the main structural elements of sedimentary basins such as: extension, thickness, salt domes and dislocations or fault lines.

Magnetometric prospecting involves measuring local anomalies in the Earth's magnetic fields. Since crustal rocks show different magnetizations, magnetic measurements can reveal information on the crustal structure. Surveys of low altitude flights are used to explore near-surface and locally restricted magnetic bodies. In somewhat greater flight heights and in flights over ice or water, the main focus is the exploration of geologic-tectonic structures on a regional scale. The method enables acquisition of data about the depth of the basement and identifies the presence, depth and extension of volcanic or plutonic masses within sedimentary sequences.

For mineral, oil and gas exploration, gravity and magnetic data are traditionally acquired by specialized sensors that record the field variations on specific regions of the Earth's surface. Land-surveys provide accurate high-resolution measurements, but are typically performed by an operator in the field using a variety of available tools. Such an operator is limited by certain physical restrictions such as the amount of ground that one can cover, the height at which the operator can take measurements, etc.

Airborne vehicles are often used to quickly acquire measurements in a large area of study, or in an area including sites of measurement that are difficult to reach by ground. Different types of aircrafts are typically used, ranging from planes to helicopters. However, airborne vehicles usually acquire data at high altitudes, and thus the measurements that can be acquired are of low resolution.

Further, the processes of gravimetric and magnetometric measurements are typically carried out separately, each process providing solutions for the subsurface structures that are rarely unambiguous and unique. The analyst may then use additional geophysical data to fully interpret the acquired gravity and magnetic measurements.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some aspects, embodiments disclosed herein relate to a measurement vehicle, including a geophysical sensor, one or more operational sensors configured to detect operational data related to operation of the measurement vehicle, a driving system configured to move the measurement vehicle in a travel direction relative to a measurement point, and a controller configured to receive information from the geophysical sensor and the operational sensors, and to control the driving system based on the information.

In other aspects, embodiments disclosed herein relate to a method for acquiring geophysical measurements with a measurement vehicle. The method involves receiving, by a controller, a plurality of mission parameters comprising a three-dimensional navigation path, wherein the navigation path comprises a plurality of target measurement points; asserting, by a driving system, a speed and a travel direction of the measurement vehicle relative to a measurement point, according to the navigation path; collecting geophysical measurements via one or more geophysical sensors at the target measurement points; collecting, by one or more operational sensors, operational data of the measurement vehicle; determining, by the controller, a modified mission parameter based on the geophysical measurements and the operational data; and adjusting, by the controller, the mission parameters based on the modified mission parameter.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
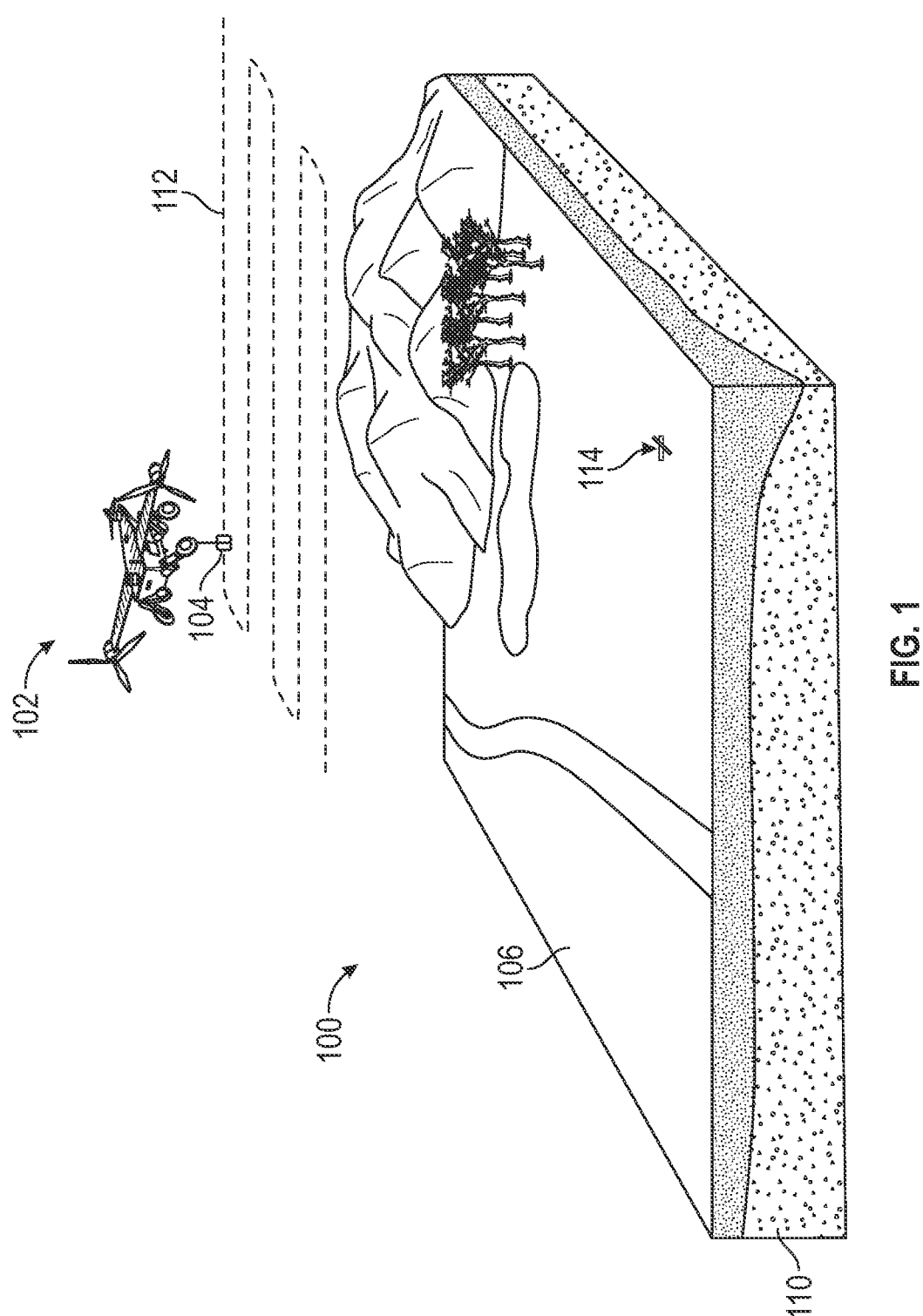
FIG. 1 shows an illustrative schematic diagram of an illustrative measurement vehicle operating in a region in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include a method and an apparatus for autonomous measurement of gravity and magnetic fields, thus enhancing subsurface characterization for mineral, oil and gas exploration and production industry. More specifically, one or more embodiments relate to a measurement vehicle with capabilities to conduct autonomous surveys in uneven terrains and at multiple elevations in the air. The measurement vehicle may be equipped to measure the gravity and magnetic fields simultaneously, providing data to incorporate more robust constraints to the geophysical inversion problem. Embodiments disclosed herein aim to optimize and automate the routine process of collecting gravimetric and/or magnetic data. At the same time, the proposed device implies ability to control the survey resolution independently from the type of exploration area. The device conducts data acquisition in midair and on various types of terrain, including hard-to-reach places, using an apparatus equipped with chassis and/or propulsion system simultaneously and with one or more sensors for gravimetric and/or magnetic surveys.

According to some embodiments, a measurement vehicle that can move autonomously or by remote control is provided, reducing the costs of crew participation and improving the accuracy of measurements as such measurements can be performed multiple times.

Some embodiments may feature vertical take-off and landing capabilities that are useful when the area of study includes measurement points at hard-to-reach places. In some embodiments the measurement vehicle may allow data acquisition in the presence of significant differences in altitude of the survey area. Other vehicles may be equipped to adapt their movement in uneven terrains. Some designs may allow for acquisition of magnetic field measurements that are free from noise generated by the surroundings and by the components of the measurement vehicle. Furthermore, in one or more embodiments, the measurement vehicle may be capable of simultaneously flying and landing guided by a control system.

FIG. 1. shows a schematic diagram illustrative of geophysical data acquisition in a region in accordance with one or more embodiments. As illustrated in FIG. 1, a region of the Earth subsurface (100) may include flat terrains, regions with irregular topography, regions with dense vegetation and even superficial deposits of water. A measurement vehicle (102) may fly above the ground (106) at altitudes of from several meters (e.g., 3 m) to hundreds of meters (e.g., 200 m), and/or walk or roll along the ground (106), depending on, for example, the objectives of the survey. The measurement vehicle (102) is configured to carry the sensors (104) and measure the geophysical fields. The measurements may carry information about the structure of the subsurface (110). In one or more embodiments, the measurement vehicle (102) may be an autonomous robotic vehicle.

The measurement vehicle (102) may be configured to acquire data at one or more measurement points arranged along regularly spaced lines (112) within specified survey areas. One or more base stations (114) may be chosen in the study area to allow for recharging and servicing the measurement vehicle (102) and/or for recording reference measurements for corrections of the gravity and/or magnetic field, among other things.

Figure 2:
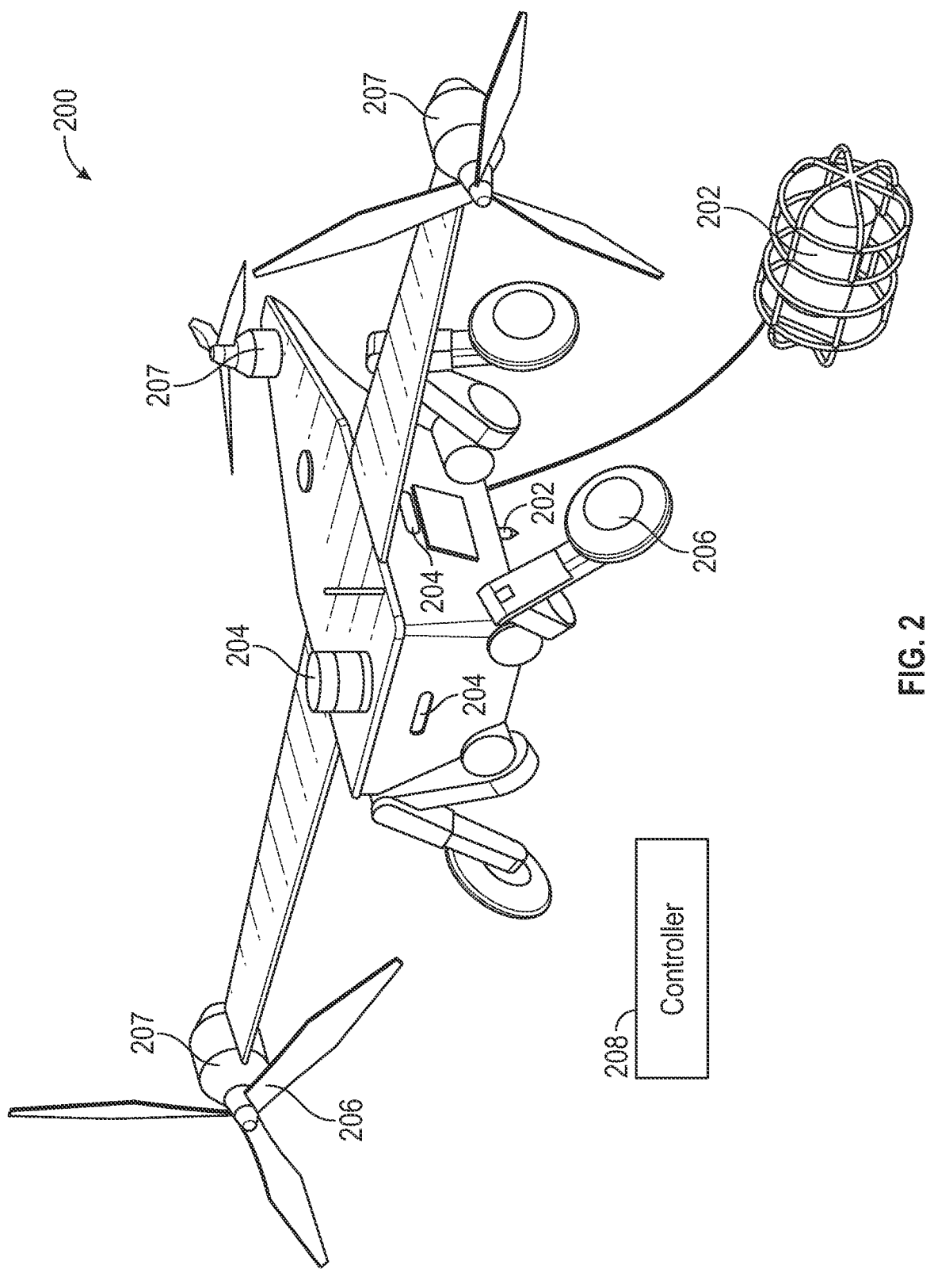
FIG. 2 shows an illustrative perspective view of a measurement vehicle for geophysical surveys in airplane mode in accordance with one or more embodiments.

FIG. 2. illustrates a perspective view of a measurement vehicle (200) for geophysical surveys according to embodiments of the present disclosure. Specifically, the measurement vehicle (200) of FIG. 2 is a more detailed version of that shown in FIG. 1 (102). The measurement vehicle (200) of FIG. 2 is equipped with one or more geophysical sensors (202) configured to acquire geophysical data (i.e., gravity and/or magnetic field). Operational sensors (204) are provided to detect operational data related to the operation of the measurement vehicle (200). Examples of operational sensors (204) include, but are not limited to, optical, inertial magnetic, and/or resistive sensors. Operational data may include, for example, position and motion of the measurement vehicle (200) and of the different components of the measurement vehicle (200).

The measurement vehicle (200) is equipped with a driving system (206) to provide mobility on the ground or in mid-air, according to the desired trajectory. The driving system (206) may be any suitable system for movement of the measurement vehicle (200). For example, the driving system (206) may be a propulsion system (207) that enables flying of the measurement vehicle, a set of robotic wheels, a combination of wheels and robotic legs, and may include other movement oriented components such as a gyroscope, etc. A controller (208) commands the driving system (206) to move the measurement vehicle (200) based on the geophysical data and the operational data received by the controller (208). The controller (208) may be any suitable remote controlling device with a processor and memory for executing an appropriate software.

The shape of the measurement vehicle (200) may be any suitable shape for carrying out tasks for particular operating conditions. For example, the measurement vehicle may be streamlined (e.g., the shape of an airplane) according to aerodynamic capabilities desired for surveys. The measurement vehicle (200) may also include protruding elements and/or structural holes for connecting different components. Further, the measurement vehicle (200) may be manufactured using one or a combination of materials, for example, metal, plastic, composite, or any other suitable materials to protect the electronic components from environmental factors (e.g., humidity, heat, cold, dust, sand, etc.). That is, the body of the measurement device provides protection against negative environmental influences (e.g., temperature fluctuations, humidity, dust, etc.) and reliably maintains the temperature of the internal components of the device (e.g., a gravimeter discussed below) to ensure that there is no drift of sensor measurements due to temperature.

Figure 3:
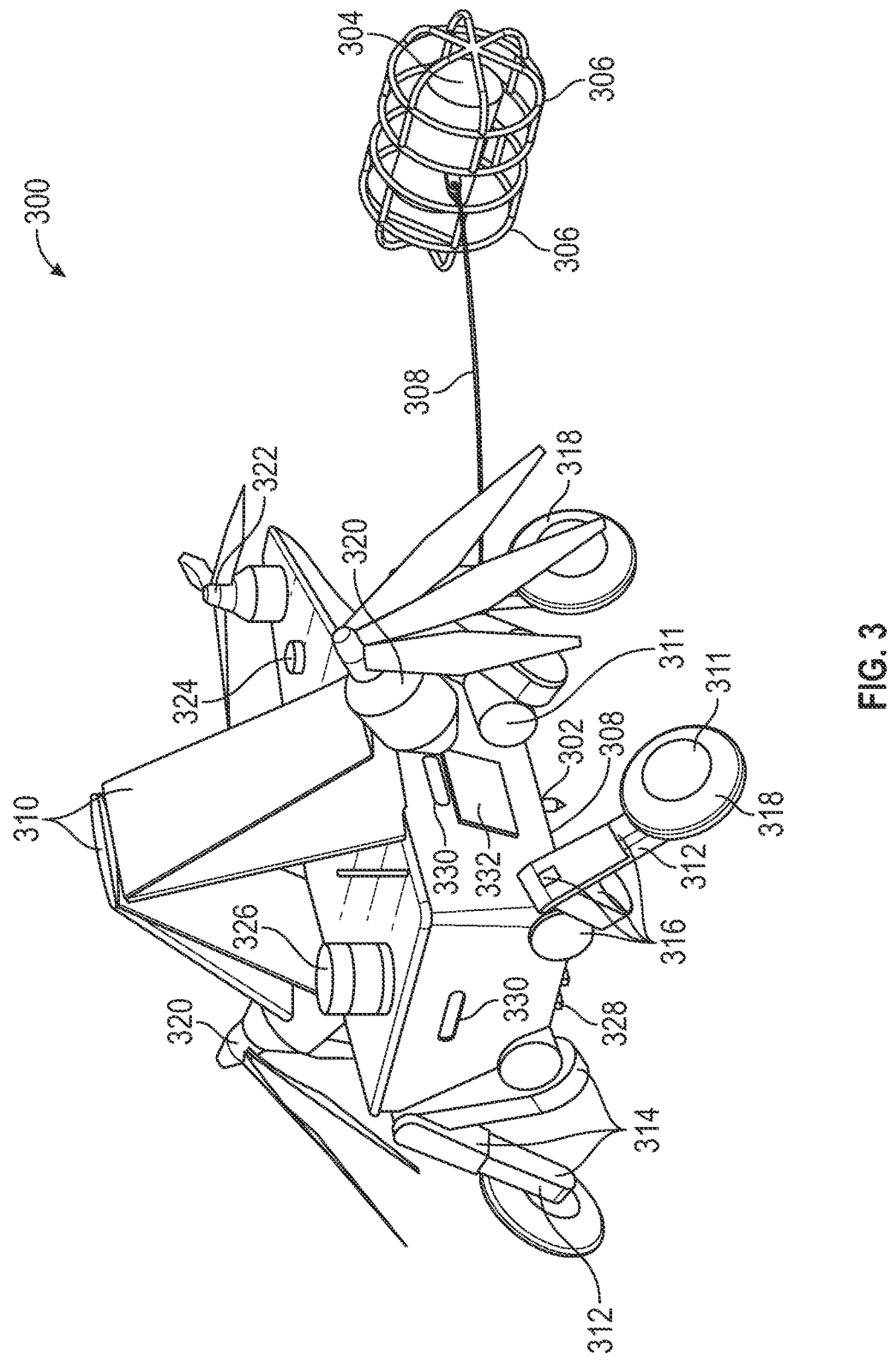
FIG. 3 shows an illustrative perspective view of a measurement vehicle for geophysical surveys in accordance with one or more embodiments.

FIG. 3. illustrates another perspective view of the measurement vehicle (300) for geophysical surveys in accordance with one or more embodiments. As shown in FIG. 3, the geophysical sensors of the measurement vehicle may include a gravimetric sensor (302), configured to measure the gravity field, and a magnetometer (304), configured to measure the magnetic field.

The magnetometer (304) may be disposed in a magnetometer chassis (306) to adapt the movement of the magnetometer (304) to an uneven terrain during ground surveys. Examples of components of the magnetometer chassis (306)

that allow adaptation of the magnetometer (304) to the terrain include, but are not limited to, mesh wheels, a rolling cage, tracks, or a telescopic antenna with a magnetometer connected to one of its ends.

In some embodiments, the gravimetric sensor (302) may be disposed in a temperature stabilized enclosure to maintain the temperature of the gravimetric sensor (302) within the suitable range of operations, for example, to minimize the gravimetric sensor drift. For example, the temperature stabilized enclosure may include passive and/or active cooling elements such as radiators, fans, heat pipes, or any other suitable commercially available cooling system configured to control temperature within the temperature stabilized enclosure.

In some embodiments, one or more base stations (114) equipped with sensors to acquire reference measurements of the gravity and/or magnetic field, among other things, may be provided. For example, a base station (114) may be equipped with a sensor configured to acquire continuously the magnetic field, allowing for the detection of temporal variations of the magnetic field. Another base station (114) may be equipped with a gravity drift correction point. This point can be used for the detection of errors caused by the drift of the gravimetric sensor (302) carried by the measurement vehicle (300).

According to some embodiments, the geophysical sensors (302) and (304) may be positioned on the ground surface by a sensor deployment system (308). The sensor deployment system may include robotic legs and/or additional actuators (not shown in FIG. 3), such as linear actuators and/or mechanisms with belts and/or leadscrews. Other possible components of the sensor deployment system are described below.

In embodiments equipped with a gravimetric sensor (302), the sensor deployment system (308) may include a positioning and stabilization mechanism like a Steadicam and/or a Gimbal. For example, a Gimbal may be equipped with inertial sensors that detect rotations of the gravimetric sensor (302) and motors that counteract those rotations, allowing for a smooth positioning of the gravimetric sensor (302).

According to embodiments of the disclosure, the magnetometer (304) may be moved away from the measurement vehicle (300) by the sensor deployment system (308), to keep the magnetometer (304) away from the influence of the metal components of the measurement vehicle, for example. The sensor deployment system (308) may include a rope attached to the measurement vehicle (300) and the rope may be combined with a power cable to provide power supply to the magnetometer (304). Furthermore, the rope may be connected to the outside of the measurement vehicle (300) and be folded to return the magnetometer (304) inside the measurement vehicle (300). In some embodiments a winch may be used to wind up the rope to return the magnetometer (304) inside the measurement vehicle (300).

In some embodiments the controller (208) controls the operation of the sensor deployment system (308), taking into account the information received from the geophysical sensors and the operational sensors. Moving the gravimetric sensor (302) from the interior of the measurement vehicle (300) to position it on the ground may be performed by the robotic legs when the information received from the gravimetric sensor (302) and the operational sensors (204) include for example, reaching a point on the ground to acquire gravimetric measurements. Similarly, moving the magnetometer (304) from the interior of the measurement vehicle (300) to suspend it below the measurement vehicle (300) with a rope, may be performed when the information received from the magnetometer (302) and the operational sensors (204) include for example, reaching a point in mid-air to acquire measurements of the magnetic field.

As illustrated by the embodiment described in FIG. 3, one or more wings (310) may be connected to the body of the measurement vehicle (300) and configured to assist in landing and mid-air navigation. The wings (310) may be pivotally connected to the body of measurement vehicle and be configured to rotate to change their position in the vertical plane. For example, with wings (310) that rotate up from a horizontal plane, the measurement vehicle (300) can smoothly transition between airplane mode and landing. In a similar example, with wings (310) that rotate down to a horizontal plane, the measurement vehicle (300) can smoothly transition between take-off and airplane mode. In addition, in one or more embodiments the wings (310) may be foldable, to maintain a compact size of the measurement vehicle (300) during ground exploration and transportation. Folding of the wings (310) is not limited to the configuration shown in FIG. 3, and the wings (310) may be designed to fold only partially, or in any other suitable configuration. In addition, in some embodiments the controller (208) controls rotation and/or the folding of the wings (310), taking into account the information received from the geophysical sensors and the operational sensors. Folding of the wings (310) may be performed when the information received from the geophysical sensors and the operational sensors include for example, reaching the ground to perform a ground survey, or reaching the base station (114) for service or to acquire reference measurements. Unfolding of the wings (310) may be performed when the information received from the geophysical sensors and the operational sensors include for example, transitioning to flying mode in order to flyby an obstacle during a ground survey.

In the embodiment of FIG. 3, the driving system (206) includes a chassis (311) which provides the measurement vehicle (300) the capability of displacement on the ground. The chassis (311) may include for example, a combination of three or more robotic legs (312), and/or, according to some examples, a wheeled or tracked undercarriage. The robotic legs (312) may include for example of one or more actuators (314) or connecting links, and one or more joints (316), allowing translational and rotational motion in different degrees of freedom. The usage of robotic legs (312) provides walking ability on uneven terrains, including climbing on inclined surfaces and/or climbing on a mound of stones. In addition, wheels (318) may be connected to the robotic legs (312) as end effectors. The robotic legs (312) equipped with wheels (318) allow the measurement vehicle (300) to reduce the time to cover large distances on the ground. In some embodiments the controller (208) controls the movement of the robotic legs (312), taking into account the information received from the geophysical sensors and the operational sensors. Furthermore, in one or more embodiments the chassis (311) may include an adaptive suspension to provide stability to the measurement vehicle (300) under changing ground conditions.

In one or more embodiments, the driving system (206) is a propulsion system (207) to provide flying ability in take-off mode or in airplane more, according to the desired flying trajectory. The propulsion system (207) may include one or more motor-propeller groups, which may differ in size according to their function. The motor-propeller groups may include tiltrotors (320) and (322) as illustrated in FIG. 3, to provide vertical take-off or navigation in airplane mode as needed. The tiltrotors (320) and (322) include actuators that may be connected to the wings. Alternatively, the actuators of the tiltrotors (320) and (322) may be combined with a motor in a gondola, as shown in the embodiment of FIG. 3. By way of example only, the embodiment of FIG. 3 illustrates motor-propeller groups with tiltrotors on the sides (320) designed to be the main source of propulsion, while the smaller motor-propeller group with tiltrotors on the tail (322) is designed to be used during take-off and/or during course correction. In one or more embodiments, the propellers in one or more motor-propeller groups are variable pitch-propellers, in order to reduce drag and to maintain an optimum angle of attack.

According to some embodiments, the tiltrotors (320) may be foldable, to maintain a compact size of the measurement vehicle (300) during ground exploration and transportation. Folding of the tiltrotors (320) is not limited to the configuration shown in FIG. 3, and folding of the tiltrotors (320) may include moving the tiltrotors (320) towards the front of the measurement vehicle (300), or in any other suitable configuration. In some embodiments the controller (208) controls the folding of the tiltrotors (320), taking into account the information received from the geophysical sensors and the operational sensors.

The measurement vehicle (300) may include a power supply board connected to one or several batteries. Alternatively, some embodiments may be equipped with a gasoline or hybrid engine to supply power to the propulsion system (207). Furthermore, one or more base stations (114) may be equipped with a charging and service station, configured to recharge the batteries and/or refill the fuel tank of a measurement vehicle (300).

According to some embodiments, the operational sensors (204) may include a Global Positioning System (GPS) sensor (324) for georeferentiation of the measurement vehicle (300) in real-time. The controller (208) may receive data from the GPS sensor (324) to map on a three-dimensional earth model the position of the points where measurements are acquired.

In an embodiment that performs gravity measurements of high precision, the operational sensors (204) may include sensors that use real-time kinematic (RTK) positioning technology to detect the elevation of the gravimetric sensor with sub-centimeter accuracy. Other examples of suitable operational sensors (204) used to provide the localization of the measurement vehicle (300) with respect to the ground include, but they are not limited to, optical sensors like Light Detection and Ranging (LIDAR) sensors (326), sound sensors (328), and cameras (330).

Embodiments disclosed herein may allow the controller (208) to control autonomously the measurement vehicle (300). In addition, the base station (114) may include a user terminal to allow an operator to communicate with the controller (208) and to remote-control the measurement vehicle (102). The controller (208) may be in communication with the operational sensors (204) and the base station (114) for exchange of navigation data. More specifically, the controller may receive information regarding the surrounding environment and the position of the measurement vehicle (200). For example, the controller (208) may perform real time mapping and localization based on 3D point cloud. The 3D point cloud may be generated using one or more LIDAR sensors (326) and cameras (330) (e.g., depth Real Sense cameras) located in front, behind, and/or on the sides of the measurement vehicle (200). Furthermore, the controller (208) may compare in real-time the information acquired during the survey with information acquired during a preliminary reconnaissance of the area of study.

Measurements with GPS (324) sensors and LIDAR sensors (326) may be used by the controller (208) to map the terrain around the base station (114) allowing corrections of data about the terrain. The controller (208) may also perform ground surface corrections at the target measurement points with ultrasonic sensors and depth cameras. In addition, using the ground surface corrections, the controller (208) may determine the suitability of landing points.

In one or more embodiments, the controller (208) may process the data received from the operational sensors (204) using algorithms of computer vision, data fusion, obstacle avoidance, machine learning, behavior trees, path and motion planning, and other suitable data processing techniques known to those of ordinary skill in the art. By way of example only, the controller (208) may use machine learning procedures in order to classify the landing points in terms of safety and suitability for acquisition of accurate measurements. Then, using the processed information, the controller may adjust the operation of the robotic legs (312), the wings (310), the driving system (206), and the sensor deployment system (308), and thus, the measurement vehicle (300) may autonomously move in an unexplored area.

In some embodiments, the measurement vehicle (300) may have an embedded a user terminal (332), as shown in FIG. 3, to allow for manual operation of the measurement vehicle (300). The user terminal (332) and the user terminal at the base station (114) may include a computer processor, a main memory, an input/output device for exchanging information with an operator (e.g., a keyboard, a touch panel, a display), and a storage (e.g., a flash memory). These components may be electrically connected via a bus or the like. The user terminal (332) and the user terminal at the base station (114) may be configured to allow the operator the visualization of geophysical data and the actual status of the exploration, including path and current coordinates of the measurement vehicle (300). For example, the operator may visualize raw or preprocessed geophysical measurements, such as, time variation of the magnetic field, measurements acquired during the reconnaissance exploration, and corrected gravimetric and/or magnetic field. Other data that may be visualized with the user terminal (332) and the user terminal at the base station (114) may be for example, a digital elevation model of the area of study with terrain corrected with data from LIDAR sensors. Furthermore, the user terminal (332) and/or the user terminal at the base station (114) may be configured to perform the same tasks for data communication and processing that have been described above for the controller (208).

Figure 4:
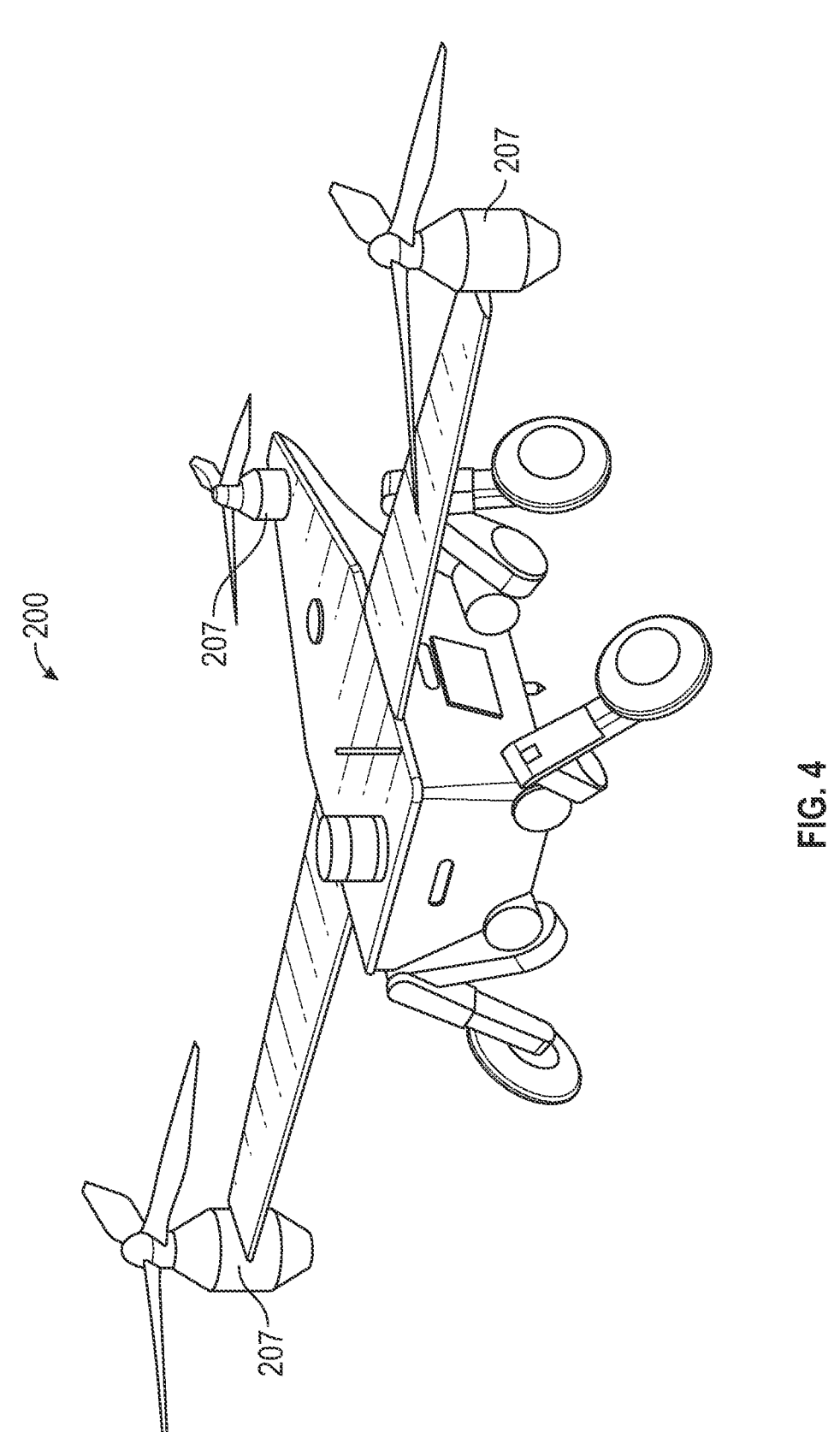
FIG. 4 shows an illustrative perspective view of a measurement vehicle in take-off mode in accordance with one or more embodiments.

The embodiment illustrated in FIG. 3 provides high flexibility for displacements during gravimetric or magnetic surveys on rough terrains and on midair. Flying ability facilitates surveying in an area with large elevation differences, or in a swampy area, or when flyby of obstacles is necessary. The tiltrotors of the propulsion system (207) allow air gravimetric and/or magnetic field measurements at different heights, depending on the desired resolution of measurements. FIGS. 2 and 4 illustrate respectively embodiments of the measurement vehicle (200) in airplane mode and take-off mode, depending on the position of the tiltrotors of the propulsion system (207). As can be seen in FIG. 4, the tiltrotor blades are in the same plane as the group, facing upward. In contrast, in FIG. 2, the tiltrotor blades are facing forward.

The measurement vehicle (300) may be configured with differing characteristics taking into consideration the relations among size, weight, energy consumption, and cost. However, the size of the measurement vehicle (300) may also be configured to be suitable to carry out surveys in areas where size restrictions may apply. For example, the measurement vehicle (300) illustrated in the embodiment of FIG. 3, equipped with a gravimetric sensor (302) that includes both a gravity gradiometer and a gravimeter, may be larger than a measurement vehicle equipped for, for example, surveying of a dense forest. Thus, a more compact and lightweight embodiment equipped with only a gravimeter may be provided to carry out a gravity survey in space-limited areas (e.g., a forest.). In another example, the measurement vehicle may be equipped with a magnetometer (304) and a propulsion system (207) only, allowing for the capability to carry out cost-effective magnetic surveys in the midair.

Figure 5:
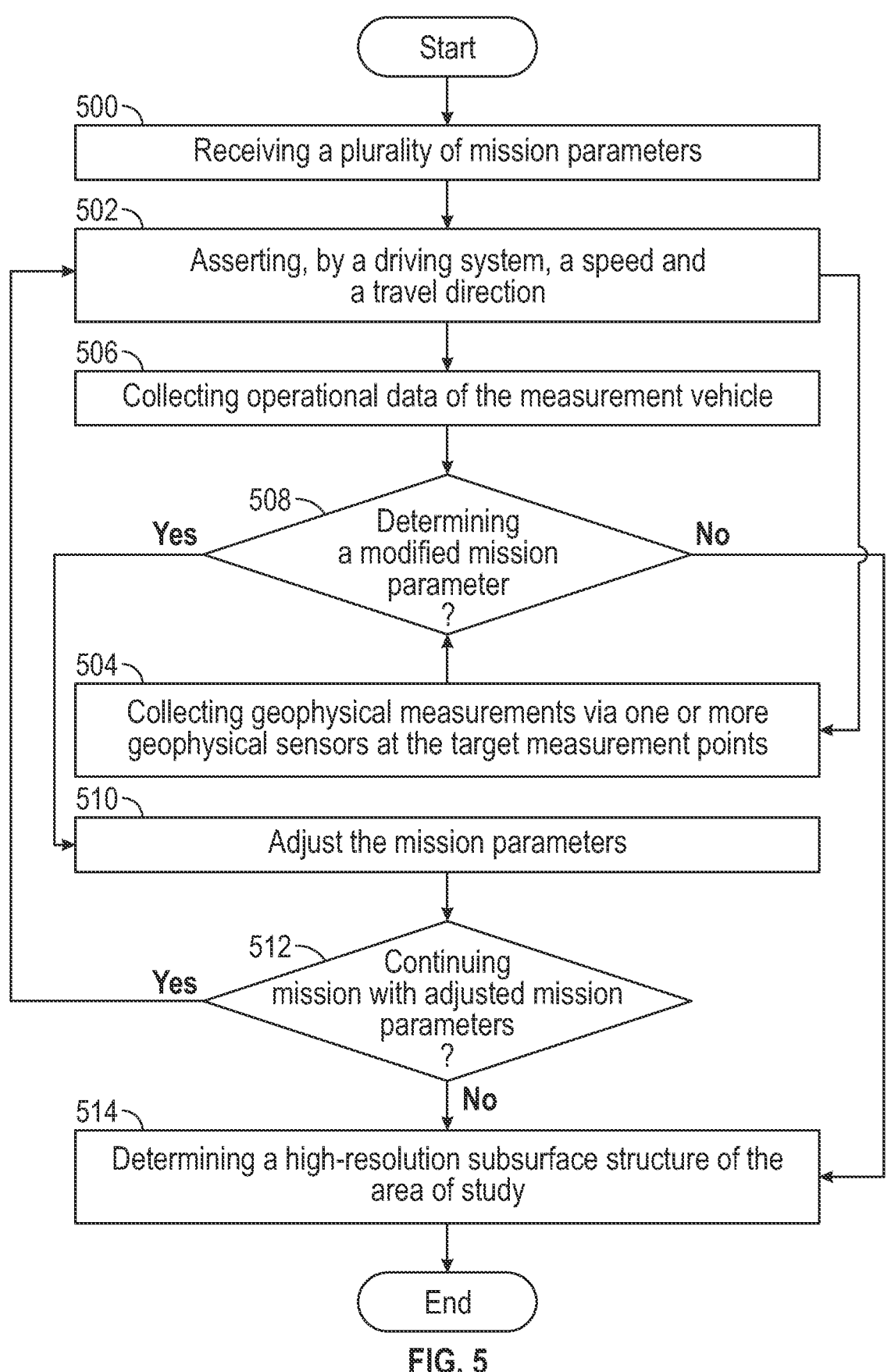
FIG. 5 is a flowchart highlighting an illustrative method for acquisition of geophysical measurements conducted by the measurement vehicle.

FIG. 5 shows a flowchart in accordance with one or more embodiments.

Specifically, FIG. 5 describes a general method for acquisition of geophysical measurements conducted by the measurement vehicle (300). While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Initially, in block (500), one or more mission parameters are received by the controller (208) of the measurement vehicle (300). The mission parameters may include a navigation path, one or more target measurement points, and a desired speed of the measurement vehicle, in accordance with one or more embodiments. Other examples of mission parameters may include one or more time intervals between measurements at the gravity base point, and measurement parameters of the sensors. The target measurement points may be located on the ground and/or at one or more elevations in mid-air. The navigation path may also include one or more measurement points that may be planned before conducting the survey and transmitted to the controller, or that may be assigned after the survey by an operator. The selection of the navigation path between the target measurement points may be made before the survey, adjusted in real time by an operator, or it may be made by the controller (208) based on operational data sent in real-time by the operational sensors (230) to the controller. The navigation path between the target measurement points may be determined based on topographic data acquired during a preliminary mission of reconnaissance of the area of study. In some embodiments, adjustment of the navigation path by an operator may be assisted with the visualization of topographic data and the navigation path at the user terminal (332) and the user terminal at the base station (114).

In block (502), the measurement vehicle (300) uses the driving system to reach the target measurement points, guided by the controller (208). As noted above, the driving system may be, in one or more embodiments, a propulsion system (207). The propulsion system (207) permits controlling the speed of the measurement vehicle (300) to provide flying ability in take-off mode or in airplane mode. The ability of transitioning between take-off and airplane mode facilitates the displacement of the measurement vehicle (300) among target measurement points in mid-air and with different elevations.

In block (504) the geophysical sensor is positioned at a target measurement point and collects geophysical measurements. In one or more embodiments, reference measurements may be also acquired at one or more base stations (114). In embodiments equipped with a sensor deployment system (308), the measurement vehicle (300) positions one or more geophysical sensors at the target measurement points. In some embodiments, the controller (208) may have the capability to pre-process the acquired geophysical measurements, rendering the data suitable for physical interpretation. Pre-processing may include correcting the geophysical measurements with the reference measurements acquired at the base station (114). Other examples of pre-processing include, but are not limited to, drift correction for the gravity sensor, removal of magnetic variations, free-air and Bouger gravity fields, topographic terrain corrections, and conventional signal processing procedures.

Continuing with the flowchart of FIG. 5, in block (506), operational data may be collected and received by the controller (208) during navigation and/or deployment of geophysical sensors, according with some embodiments. Operational data and acquired geophysical measurements may be received and used by the controller (208) to determine at least one modified mission parameter, as shown in block (508). For example, if the operational data indicates the presence of an obstacle in the original navigation path, the modified mission parameters may be new segments for the navigation path to circumvent the obstacle. In another example, if the acquired geophysical measurements indicate rapid spatial variations of the gravity/magnetic field in a region, the modified mission parameters may be new target measurement points more closely spaced in the region, in order to sample the variations of the gravity/magnetic with a desired precision. In one or more embodiments, operational data and acquired geophysical measurements may be sent to a base station (114), and the modified mission parameter may be determined also by an operator at the base station (114). In some embodiments, the modified mission parameter may be determined by an operator assisted with the visualization of pre-processed or raw geophysical measurements already acquired, via the user interface (332), or at the base station (114).

In block (510), one or more modified mission parameters are used by the controller to adjust the original mission parameters, according to an embodiment of the disclosure. Therefore, the measurement vehicle (300) equipped with a controller (208) configured to adjust the mission parameters may allow for faster surveys, since it may be capable to acquire measurements even in an unknown area, and/or to adjust the navigation path to obstacles identified in real time or from a preliminary mission of reconnaissance. In the next block (512), the controller determines if the mission continues with the adjusted mission parameters, and the process returns to block (502), to reach more target measurement points.

The results of the gravimetric or magnetic survey using the measurement vehicle (200) may include data referenced to global coordinates in the form of a 3D map of the terrain, pre-processed and raw gravity field, and pre-processed and raw magnetic field. The data provided by the gravity or magnetic survey may then be used for example in the context of a geophysical inversion problem to determine the geological structure of the subsurface of the area under study, as indicated in block (514). The measured gravity or magnetic fields may be incorporated independently in the geophysical inversion problem, or, if measurements are made simultaneously, incorporation of the coupled gravity and magnetic fields may significantly reduce uncertainties in the inverted geological structure.

Figure 6:
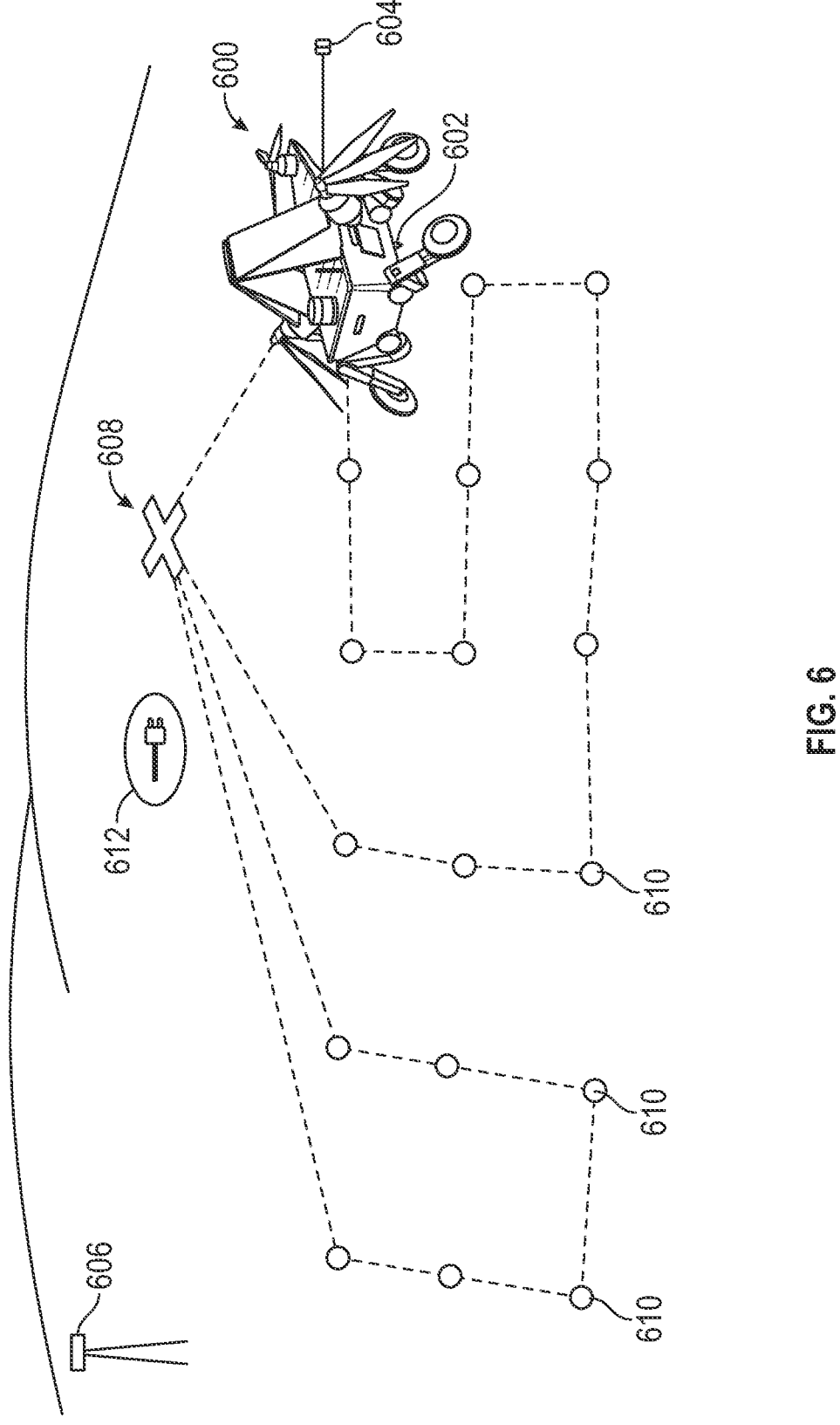
FIG. 6 shows an illustrative diagram for a method with a measurement vehicle equipped simultaneously with a gravimeter and a magnetometer, in accordance with one or more embodiments.

FIG. 6 shows a schematic diagram in accordance with one or more embodiments. FIG. 6 illustrates a method with a measurement vehicle (600) equipped with a gravimeter (602) and a magnetometer (604) simultaneously, in accordance to the embodiment just described in FIG. 2. In the embodiment of FIG. 6 the mission may include conducting a magnetic survey, and thus, it also may include a first base station (606) to record continuously the variation of the magnetic field. To minimize the level of noise on the recording of the variation of the magnetic field, the first base station (606) is located away from metal and/or moving objects. The recorded variation of the magnetic field is used to remove the magnetic field variations from measurements acquired by the magnetometer (604).

In the embodiment of FIG. 6 the measurement vehicle (600) may also acquire gravity field measurements, and a second base station (608) may be used to correct errors in the gravity field measurements introduced by the drift of the gravimeter (602). In this case, the second base station (608) needs to be located on a stable, non-moving, flat surface. If the area of study for the gravimetry survey is large, more than one base stations (608) may be possibly selected. The difference in the gravity field acquired at the different base stations (608) may be measured with a higher level of accuracy. During operation time, the measurement vehicle (600) visits the base station (608) several times, recording reference measurements of the gravity field. The trend of the drift of the gravimeter (602) is determined from the reference measurements acquired at the base station (608) and is then removed from the gravity field measurements. By way of example only, the drift of each particular gravimeter (602) may be determined by long and continuous recordings (for example, more than 6 hours) of the gravity field by the measurement vehicle (600) at the base station (608), before the start of the gravity field survey.

In one or more embodiments, the absolute gravity field value at the base station (608) may be determined, if a site with known absolute gravity field value is located in the vicinity of the area of study. The absolute gravity field at one or more target measurement points (610) may then be determined based on the relative gravity field measurements acquired by the gravimeter (602), and the absolute gravity field measured at the base station (608).

The measurement vehicle (600) may also visit the base station (608) before and after charging and/or service time. In some embodiments the charging station (612) may be located in the proximity of the base station (608) to reduce the duration of the mission. In one or more embodiments, a GPS sensor may be installed at the base station (608) or at the charging station (612), or at another chosen point on the ground surface in order to acquire high-accuracy measurements of the position of the measurement vehicle (600).

Figure 7:
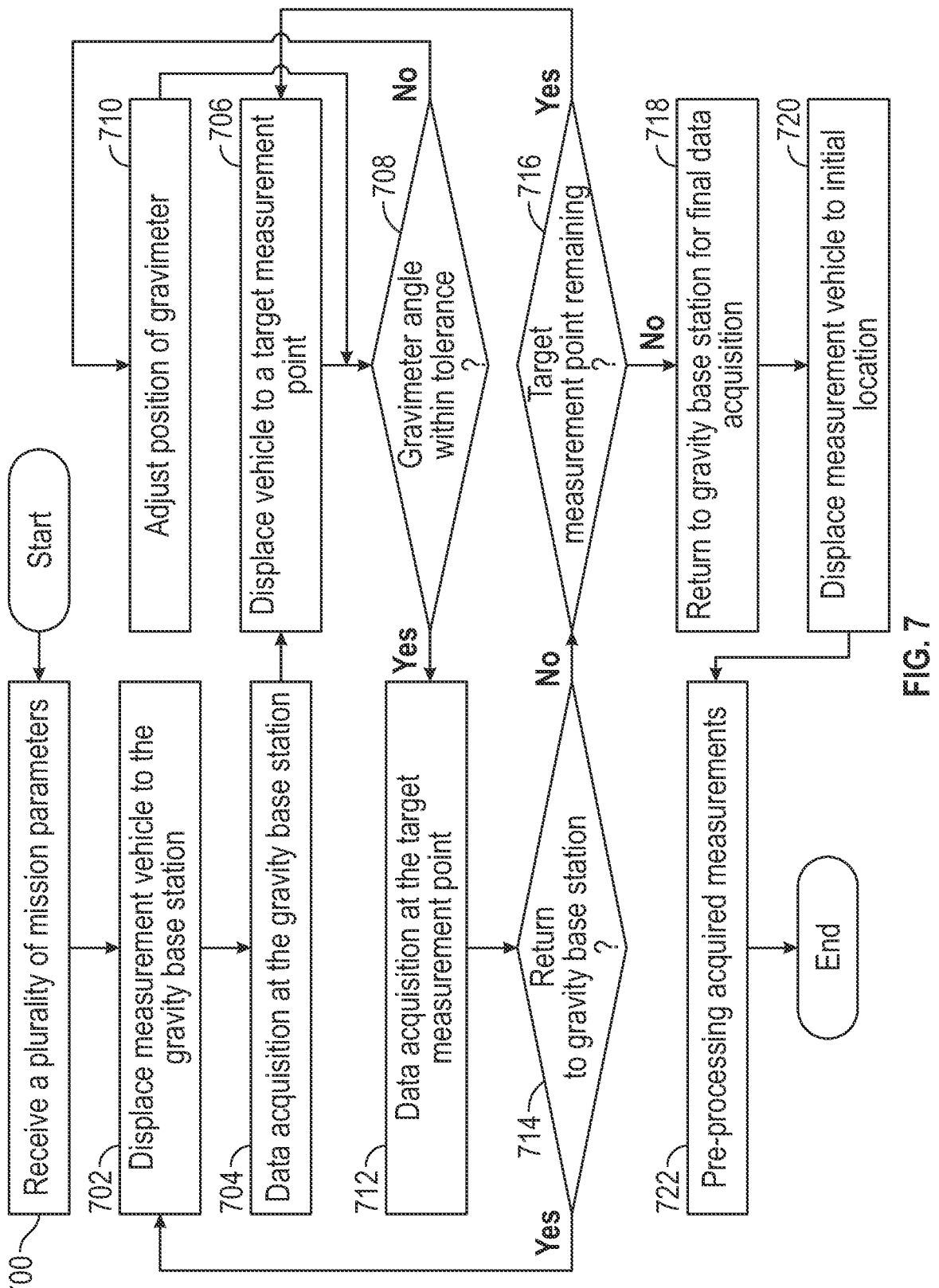
FIG. 7 is a flowchart highlighting an illustrative method for simultaneous acquisition of gravity and magnetic field data, and with the use of a gravity base station.

FIG. 7 shows a flowchart in accordance with one or more embodiments.

Specifically, FIG. 7 describes a method for simultaneous acquisition of gravity and magnetic field data, and with the use of a gravity base station (608). In the first block (700) the measurement vehicle (600) receives the mission parameters and is configured to perform the mission autonomously assisted by the controller (208). In block (702) the measurement vehicle (600) departs from an initial location and arrives to the gravity base station (608). Next, in block (704), the measurement vehicle (600) records reference measurements of the gravity field. Then the measurement vehicle (600) navigates to a target measurement point (610) according to the mission parameters, as in block (706). After reaching the target measurement point (610) the gravimeter deployment system positions the gravimeter (602) for data acquisition. In block (708) the angle of the gravimeter (602) from vertical is measured. In case the measured angle is not within the desired tolerance according to the technical specifications, the gravimeter deployment system adjusts the position of the gravimeter (602), as in block (710). After adjustment of the gravimeter position, the process returns to block (708), and the angle is again evaluated. Once the angle of the gravimeter (602) is within the desired tolerance, the measurements are acquired by the gravimeter (602), as shown in block (712).

In block (714) the controller (208) determines whether the next step is to return to the gravity base station (608) or to continue to block (716) for measurements at another target measurement point (610). In case the measurement vehicle (600) moves to the gravity base station (608) to acquire more reference measurements, the process returns to block (702). In block (716) the controller (208) now determines whether there are remaining target measurement points (610), and if that is the case the process returns to block (706) with the measurement vehicle (600) moving to one of the remaining target measurement points (610). If no target measurement points (610) remain, the measurement vehicle (600) then returns to the gravity base station (608) for final acquisition of reference measurements, as shown in block (718). The next step of the mission is returning to the initial location, as shown in block (720), where there is possibly a charging station (612). Even though a charging step is not illustrated in FIG. 7, the measurement vehicle (600) may return to the charging station (612) at any moment during the mission to charge one or more batteries, if they are discharged. The final step in the flowchart of FIG. 7 is the pre-processing of the acquired gravity field, as shown in block (722). Specifically, data pre-processing in block (722) may include using the reference measurements acquired at the gravity base station (608) to correct the acquired gravity field.

Figure 8:
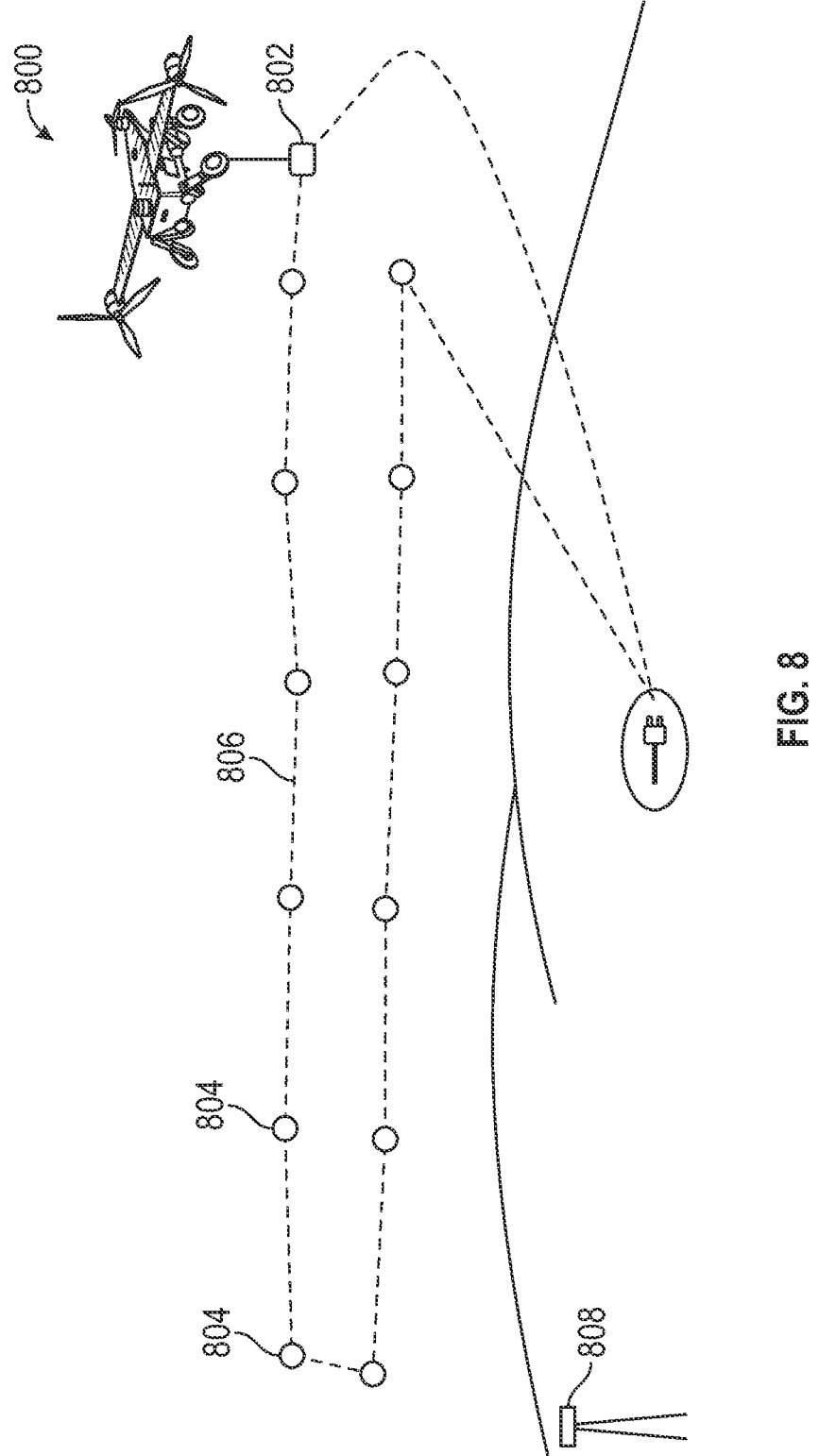
FIG. 8 shows an illustrative diagram for a method with a measurement vehicle with flying ability, equipped with a magnetometer, and possibly, with a gradiometer, in accordance with one or more embodiments.

FIG. 8 shows a schematic diagram in accordance with one or more embodiments. FIG. 8 illustrates a method with a measurement vehicle (800) with flying ability, equipped with a magnetometer (802), and possibly, with a gradiometer. In this embodiment the target measurement points (804) and the navigation path (806) may be possibly located at one or more elevations at mid-air, allowing the determination of vertical changes in the magnetic field. In this case, the survey may require only one reference station (808) to record continuously the variation of the magnetic field, and the duration of the survey may then be limited only by the capacity of the battery of the measurement vehicle (800).

Figure 9:
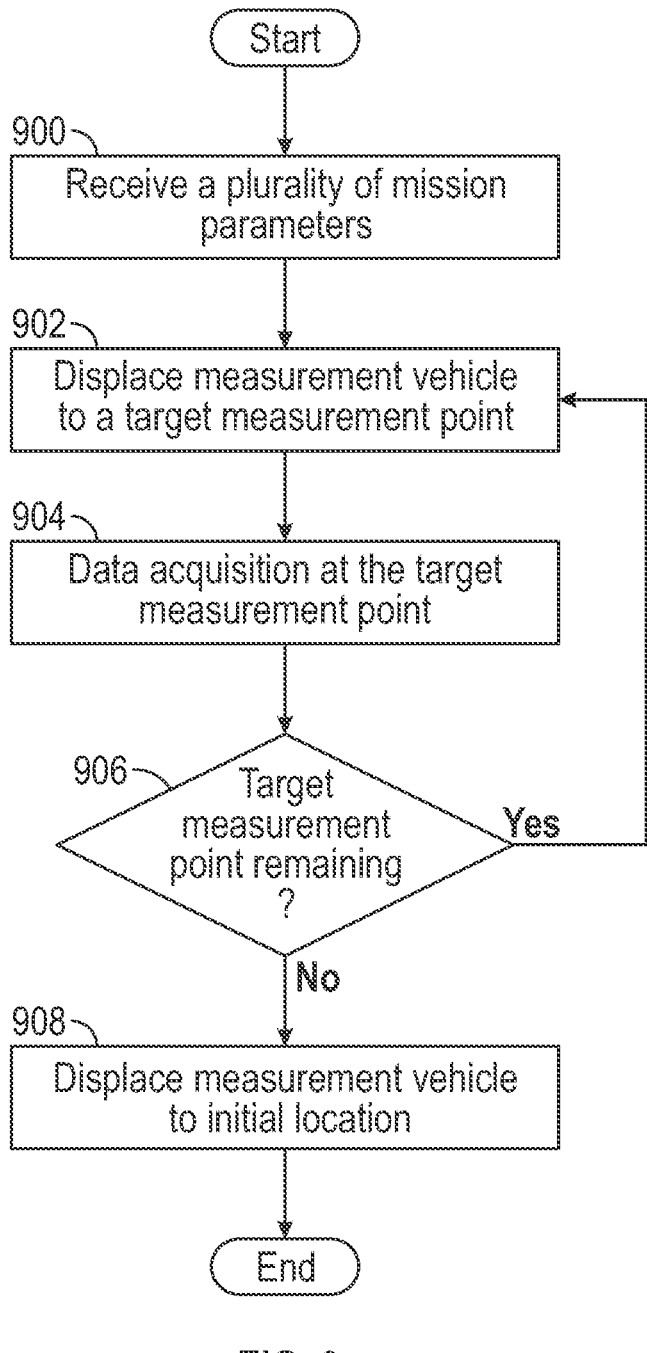
FIG. 9 is a flowchart highlighting an illustrative method for simultaneous acquisition of gravity and magnetic field data, without using of a gravity base station.

FIG. 9 shows a flowchart in accordance with one or more embodiments. Specifically, FIG. 9 describes a method for simultaneous acquisition of gravity and magnetic field data, without using of a gravity base station. In the first block (900) the measurement vehicle (800) receives the mission parameters and is configured to perform the mission autonomously assisted by the controller (208). In block (902) the measurement vehicle (800) departs from an initial location and navigates to a target measurement point (804) according to the mission parameters. In the next step, the measurements are acquired by the geophysical sensors, as shown in block (904).

In block (906) the controller (208) determines whether there are remaining target measurement points (804), and if that is the case, the process returns to block (902) with the measurement vehicle (800) moving to one of the remaining target measurement points (804). If no target measurement points (804) remain, then the final step of the mission is the return of the measurement vehicle (800) to the initial location, as shown in block (908).

Figure 10:
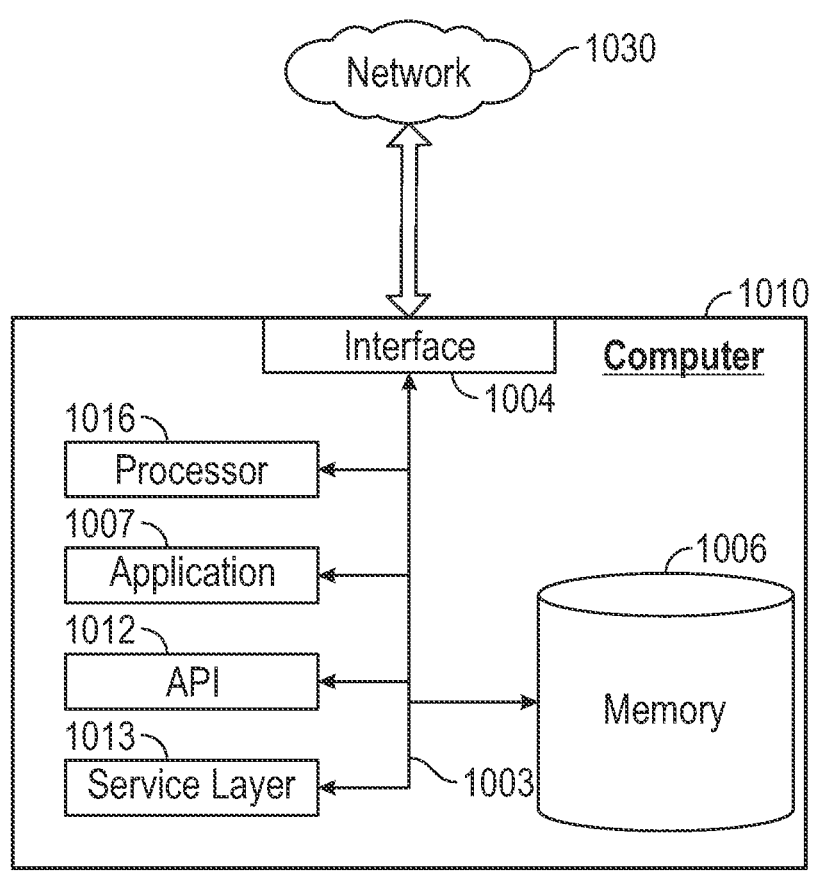
FIG. 10 shows an illustrative computing system that may be implemented as one or more components of the system.

FIG. 10 is a block diagram of a computer (1010) used to provide computational functionalities associated with described algorithms, methods, functions, processes, flows, and procedures as described in the instant disclosure, according to an implementation. The illustrated computer (1010) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. For example, such a device may form part of the user terminal at the base station (114), the user terminal (332), and/or the controller (208), among other things. Additionally, the computer (1010) may include a computer that includes an input device, such as a keypad, keyboard, touch screen, or other device that can accept user information, and an output device that conveys information associated with the operation of the computer (1010), including digital data, visual, or audio information (or a combination of information), or a graphical user interface (GUI).

The computer (1010) can serve in a role as a client, a network component, a server, a database or other persistency, or any other component (or a combination of roles) of a computer for performing the subject matter described in the instant disclosure. The illustrated computer (1010) may be implemented as the controller (208) described above and may perform operations consistent therewith. In some implementations, one or more components of the computer (1010) may be configured to operate within environments, including cloud-computing-based, local, global, or other environment (or a combination of environments).

At a high level, the computer (1010) is an electronic computing device operable to receive, transmit, process, store, or manage data and information associated with the described subject matter. According to some implementations, the computer (1010) may also include or be communicably coupled with an application server, e-mail server, web server, caching server, streaming data server, business intelligence (BI) server, or other server (or a combination of servers).

The computer (1010) can receive requests over network (1030) from a client application (e.g., executing on another computer (1010)) and responding to the received requests by processing the said requests in an appropriate software application. In addition, requests may also be sent to the computer (1010) from internal users (for example, from a command console or by other appropriate access method), external or third-parties, other automated applications, as well as any other appropriate entities, individuals, systems, or computers.

Each of the components of the computer (1010) can communicate using a system bus (1003). In some implementations, any or all of the components of the computer (1010), both hardware or software (or a combination of hardware and software), may interface with each other or the interface (1004) (or a combination of both) over the system bus (1003) using an application programming interface (API) (1012) or a service layer (1013) (or a combination of the API (1012) and service layer (1013). The API (1012) may include specifications for routines, data structures, and object classes. The API (1012) may be either computer-language independent or dependent and refer to a complete interface, a single function, or even a set of APIs. The service layer (1013) provides software services to the computer (1010) or other components (whether or not illustrated) that are communicably coupled to the computer (1010).

The functionality of the computer (1010) may be accessible for all service consumers using this service layer. Software services, such as those provided by the service layer (1013), provide reusable, defined business functionalities through a defined interface. For example, the interface may be software written in JAVA, C++, or other suitable language providing data in extensible markup language (XML) format or another suitable format. While illustrated as an integrated component of the computer (1010), alternative implementations may illustrate the API (1012) or the service layer (1013) as stand-alone components in relation to other components of the computer (1010) or other components (whether or not illustrated) that are communicably coupled to the computer (1010). Moreover, any or all parts of the API (1012) or the service layer (1013) may be implemented as child or sub-modules of another software module, enterprise application, or hardware module without departing from the scope of this disclosure.

The computer (1010) includes an interface (1004). Although illustrated as a single interface (1004) in FIG. 10, two or more interfaces (1004) may be used according to particular desires or implementations of the computer (1004). The interface (1004) is used by the computer (1010) for communicating with other systems in a distributed environment that are connected to the network (1030). Generally, the interface (1004) includes logic encoded in software or hardware (or a combination of software and hardware) and operable to communicate with the network (1030). More specifically, the interface (1004) may include software supporting one or more communication protocols associated with communications such that the network (1030) or interface's hardware is operable to communicate physical signals within and outside of the illustrated computer (1010).

The computer (1010) includes at least one computer processor (1016). Although illustrated as a single computer processor (1016) in FIG. 10, two or more processors may be used according to particular desires or particular implementations of the computer (1010). Generally, the computer processor (1016) executes instructions and manipulates data to perform the operations of the computer (1010) and any algorithms, methods, functions, processes, flows, and procedures as described in the instant disclosure.

The computer (1010) also includes a memory (1006) that holds data for the computer (1010) or other components (or a combination of both) that can be connected to the network (1030). For example, memory (1006) may include a database storing data (e.g., log files) and/or processing instructions consistent with this disclosure. Although illustrated as a single memory (1006) in FIG. 10, two or more memories may be used according to implementations of the computer (1010) and the described functionality. While memory (1006) is illustrated as an integral component of the computer (1010), in alternative implementations, memory (1006) can be external to the computer (1010).

The application (1007) is an algorithmic software engine providing functionality according to implementations of the computer (1010), particularly with respect to functionality described in this disclosure. For example, application (1007) can serve as one or more components, modules, applications, etc. configured to cause the computer (1010) to function as the controller (208) (e.g., monitoring temperature and/or motion within the space). Further, although illustrated as a single application (1007), the application (1007) may be implemented as multiple applications (1007) on the computer (1010). In addition, although illustrated as integral to the computer (1010), in alternative implementations, the application (1007) can be external to the computer (1010).

There may be any number of computers (1010) associated with, or external to, a computer system containing computer (1010), each computer (1010) communicating over network (1030). Further, the term "client." "user," and other appropriate terminology may be used interchangeably as appropriate without departing from the scope of this disclosure. Moreover, this disclosure contemplates that many users may use one computer (1010), or that one user may use multiple computers (1010).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A measurement vehicle comprising:
   a geophysical sensor comprising a magnetometer disposed within a magnetometer chassis configured to adapt a movement of the magnetometer to an uneven terrain, wherein the magnetometer chassis comprises at least one of a rolling cage, tracks, or a telescopic antenna;
   one or more operational sensors configured to detect operational data related to operation of the measurement vehicle;
   a driving system configured to move the measurement vehicle in a travel direction relative to a measurement point; and
   a controller configured to receive information from the geophysical sensor and the one or more operational sensors, and to control the driving system based on the information.

2. The measurement vehicle of claim 1, wherein the geophysical sensor further comprises a gravimetric sensor.

3. The measurement vehicle of claim 2, further comprising a sensor deployment system mounted on the measurement vehicle and configured to position the geophysical sensor at the measurement point.

4. The measurement vehicle of claim 3, wherein the controller is configured to control deployment of the geophysical sensor based on the information.

5. The measurement vehicle of claim 1, further comprising a plurality of wings, each of the plurality of wings being pivotally coupled to the measurement vehicle at a proximal end of a respective wing.

6. The measurement vehicle of claim 5, wherein at least one of the plurality of wings is foldable.

7. The measurement vehicle of claim 6, wherein the controller is further configured to cause one or more of the plurality of wings to fold or unfold based at least in part on the information.

8. The measurement vehicle of claim 6, wherein the controller is further configured to pivot the one or more of the plurality of wings to modify an attitude of the measurement vehicle in a three-dimensional space.

9. The measurement vehicle of claim 1, wherein the driving system comprises a plurality of robotic legs coupled to a body of the measurement vehicle, wherein each of the plurality of robotic legs comprise a plurality of joints, and wherein each of the plurality of joints enable one or more of translational and rotational motion.

10. The measurement vehicle of claim 9, wherein the driving system further comprises a plurality of wheels, wherein one or more of the plurality of wheels being coupled to each of the plurality of robotic legs.

11. The measurement vehicle of claim 9, wherein the controller is further configured to control the plurality of robotic legs to adapt a movement of the measurement vehicle to a ground surface based at least in part on the information.

12. The measurement vehicle of claim 1, wherein the driving system comprises a propulsion system configured to move the measurement vehicle in one or more of a vertical travel direction and a horizontal travel direction relative to the measurement point.

13. The measurement vehicle of claim 12, wherein the propulsion system comprises a plurality of tiltrotors, wherein each of the plurality of tiltrotors is configured to transition between vertical and horizontal propulsion.

14. The measurement vehicle of claim 13, wherein one or more of the plurality of tiltrotors is foldable, and wherein the controller is configured to cause folding of the one or more of the plurality of tiltrotors based at least in part on the information.

15. The measurement vehicle of claim 1, wherein the one or more operational sensors comprise a global positioning system (GPS) sensor in communication with the controller, wherein the GPS sensor is configured to relate the measurement point with a position on a three-dimensional earth.

16. The measurement vehicle of claim 1, wherein the controller is further configured to receive commands from a remote-control station, and to modify the operation of the measurement vehicle based on the commands.

17. A method for acquiring geophysical measurements with a measurement vehicle, the method comprising:
   receiving, by a controller, a plurality of mission parameters comprising a three-dimensional navigation path, wherein the three-dimensional navigation path comprises a plurality of target measurement points;
   asserting, by a driving system, a speed and a travel direction of the measurement vehicle relative to a measurement point, according to the three-dimensional navigation path;
   collecting the geophysical measurements via one or more geophysical sensors at the plurality of target measurement points, wherein the one or more geophysical sensors comprises a magnetometer disposed within a magnetometer chassis configured to adapt a movement of the magnetometer to an uneven terrain, wherein the magnetometer chassis comprises at least one of a rolling cage, tracks, or a telescopic antenna;
   collecting, by one or more operational sensors, operational data of the measurement vehicle;
   determining, by the controller, a modified mission parameter based on the geophysical measurements and the operational data; and
   adjusting, by the controller, the plurality of mission parameters based on the modified mission parameter.

18. The method of claim 17, wherein acquiring the geophysical measurements is performed autonomously by the measurement vehicle based at least in part on the plurality of mission parameters.

19. The method of claim 17, wherein acquiring the geophysical measurements is performed by the measurement vehicle based at least in part on the modified mission parameter received from a remote-control station.

20. The method of claim 17, further comprising:

recording reference measurements at one or more reference points located on a ground surface and in a vicinity of at least one of the plurality of target measurement points; and modifying the geophysical measurements based on the reference measurements.

21. The method of claim 17, further comprising pre-processing the geophysical measurements and determining the modified mission parameter based on the pre-processed geophysical measurements.

* * * * *